(12) United States Patent
Bromley et al.

(10) Patent No.: US 7,604,248 B2
(45) Date of Patent: Oct. 20, 2009

(54) SLIDING SUSPENSION LOCKING PIN SYSTEM

(75) Inventors: Braden J. Bromley, Royal Oak, MI (US); Steven G. Saieg, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 592 days.

(21) Appl. No.: 11/432,850

(22) Filed: May 12, 2006

(65) Prior Publication Data

US 2007/0262554 A1 Nov. 15, 2007

(51) Int. Cl.
*B62D 53/06* (2006.01)
(52) U.S. Cl. ................. 280/149.2; 280/407.1; 280/81.1
(58) Field of Classification Search .............. 280/149.2, 280/407.1, 81.1
See application file for complete search history.

(56) References Cited

U.S. PATENT DOCUMENTS

| | | | | |
|---|---|---|---|---|
| 3,087,741 A * | 4/1963 | De Lay | ..................... | 280/81.1 |
| 3,096,993 A * | 7/1963 | McKay | ..................... | 280/81.1 |
| 3,618,969 A * | 11/1971 | Glassmeyer | ............. | 280/149.2 |
| 4,838,566 A * | 6/1989 | Baxter et al. | ............. | 280/149.2 |
| 4,838,578 A * | 6/1989 | Baxter | ..................... | 280/149.2 |
| 5,088,763 A * | 2/1992 | Galazin et al. | ............. | 280/656 |
| 5,449,190 A * | 9/1995 | Ford | ........................ | 280/407.1 |
| 5,462,301 A * | 10/1995 | Schueman | ............... | 280/149.2 |
| 5,480,171 A * | 1/1996 | Cheffey | .................. | 280/149.2 |
| 5,505,475 A * | 4/1996 | Turner | ..................... | 280/149.2 |
| 5,531,467 A * | 7/1996 | Schueman | ............... | 280/149.2 |
| 5,642,896 A * | 7/1997 | Pierce et al. | ............. | 280/149.2 |
| 5,716,071 A * | 2/1998 | Stanley et al. | ............ | 280/407.1 |
| 5,720,489 A * | 2/1998 | Pierce et al. | ............. | 280/149.2 |
| 6,409,192 B1 * | 6/2002 | Botts | ........................ | 280/149.2 |
| 2005/0104316 A1 * | 5/2005 | Pappas | .................... | 280/149.2 |

* cited by examiner

*Primary Examiner*—Paul N. Dickson
*Assistant Examiner*—George D. Spisich
(74) *Attorney, Agent, or Firm*—Carlson, Gaskey & Olds

(57) ABSTRACT

A sliding suspension includes a plurality of locking pins that are selectively moved between extended and retracted positions to allow adjustment of the sliding suspension relative to a trailer frame structure. A lever is fixed to a tube that is supported by a cross-member of a slider frame. A cam is supported on the tube for rotational movement relative to the tube. Laterally spaced locking pins each include a pin connection link that is coupled to the cam. Each locking pin includes a single compression spring, and each pin connection link includes a slot, which cooperate with each other to provide independent pin extension at each pin location. A torsion spring is coaxial with the tube and includes one spring end that is coupled to the lever and another spring end that is coupled to the cam. The torsion spring allows the lever to be decoupled from the locking pins if one or more pins are stuck such that the pull handle can be pulled and locked into place to allow adjustment.

18 Claims, 11 Drawing Sheets

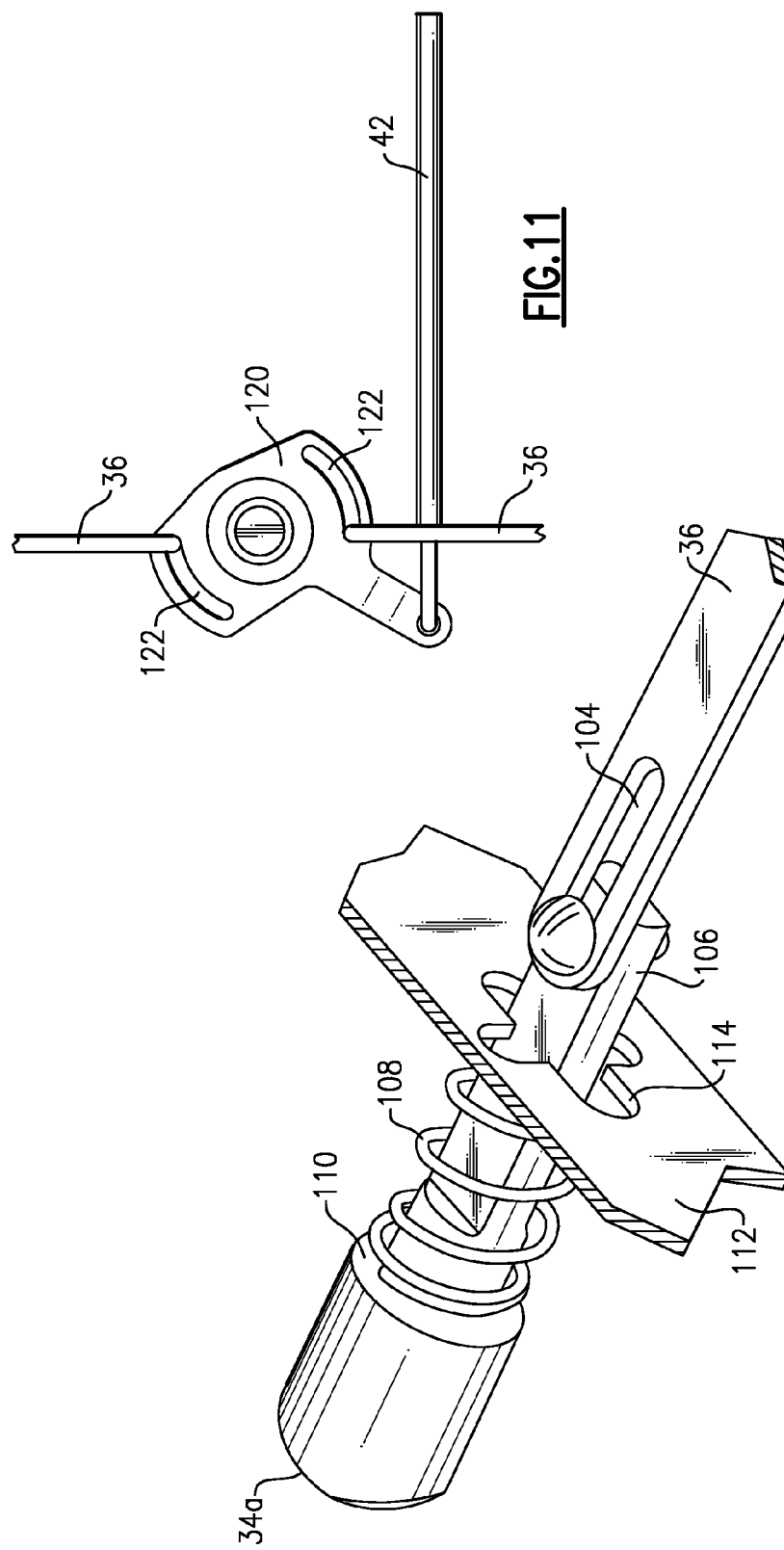

SLIDING SUSPENSION LOCKING PIN SYSTEM

TECHNICAL FIELD

The subject invention relates to a locking mechanism for a slider suspension.

BACKGROUND OF THE INVENTION

Sliding suspensions are used to reposition wheels relative to a frame to redistribute axle loads as needed. These sliding suspensions include a locking system that locks the sliding suspension in a desired position relative to the frame. The locking system includes a series of pins that are received in openings formed within the frame to lock the sliding suspension to the frame. To adjust the position of the sliding suspension, the pins are unlocked from the frame and a vehicle then moves the frame relative to the sliding suspension in to a desired position. The pins are then again locked to the frame.

One disadvantage with current systems is that pins may become stuck in an extended position, which significantly increases the effort required to make an adjustment. Or, the vehicle could be driven without the pins being fully engaged to the frame. This could cause the sliding suspension to collide with the frame resulting in damage to suspension components.

Thus, it would be beneficial to have a locking system with independent pin extension, and which that can easily retract a stuck pin to overcome these difficulties.

SUMMARY OF THE INVENTION

A pin locking mechanism for a sliding suspension utilizes a cam and a torsion spring that cooperate with each other to decouple a pull handle from locking pins. This allows the pull handle to be pulled out and locked into place for adjustment even if one or more locking pins are struck.

The pin locking mechanism also provides independent pin extension at each pin location. Each pin has a pin connecting link that has one end coupled to the cam and an opposite end associated with the pin. The independent pin extension is accomplished by a compression spring, one of which is associated with each pin, in combination with slots that are formed in pin connecting links or in the cam. The pin locking mechanism provides improved engagement and disengagement of pins with reduced adjustment effort.

These and other features of the present invention can be best understood from the following specification and drawings, the following of which is a brief description.

BRIEF DESCRIPTION OF THE DRAWINGS

FIG. 10 is a perspective view of a pin and pin connection link assembly.

FIG. 11 is an alternate example of a cam member for the locking mechanism.

DETAILED DESCRIPTION OF THE PREFERRED EMBODIMENT

A slider 10 is used to reposition wheels relative to a trailer support structure, associated with a trailer that is pulled by a vehicle (not shown) to redistribute axle loads as needed. The slider 10 includes a locking mechanism 14 that locks the slider 10 in a desired position relative to the trailer support structure. Trailer support structures are well known and any type of trailer support structure can be used with the slider 10.

Figure 1:
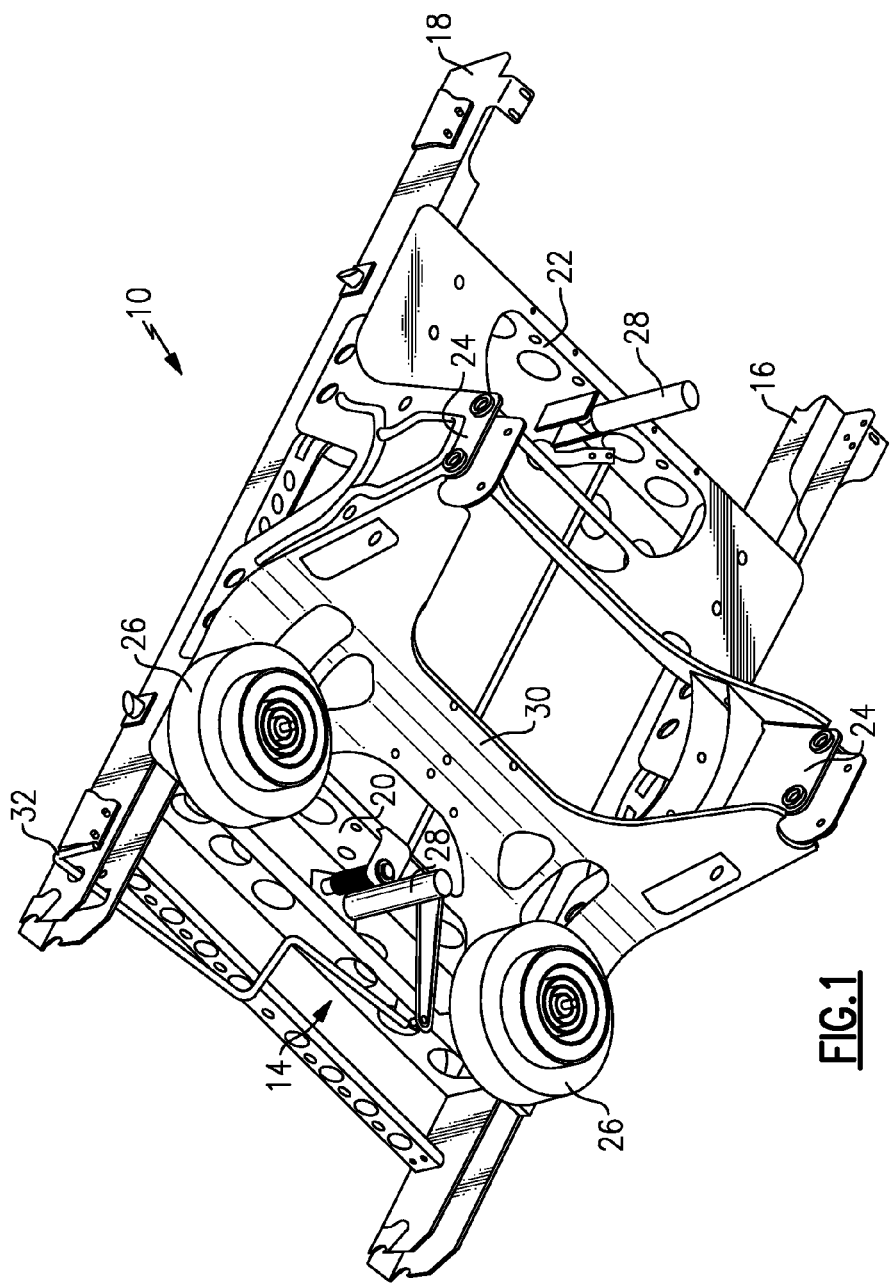
FIG. 1 is a bottom perspective view of a suspension slider incorporating one example configuration of a locking mechanism.
Figure 2:
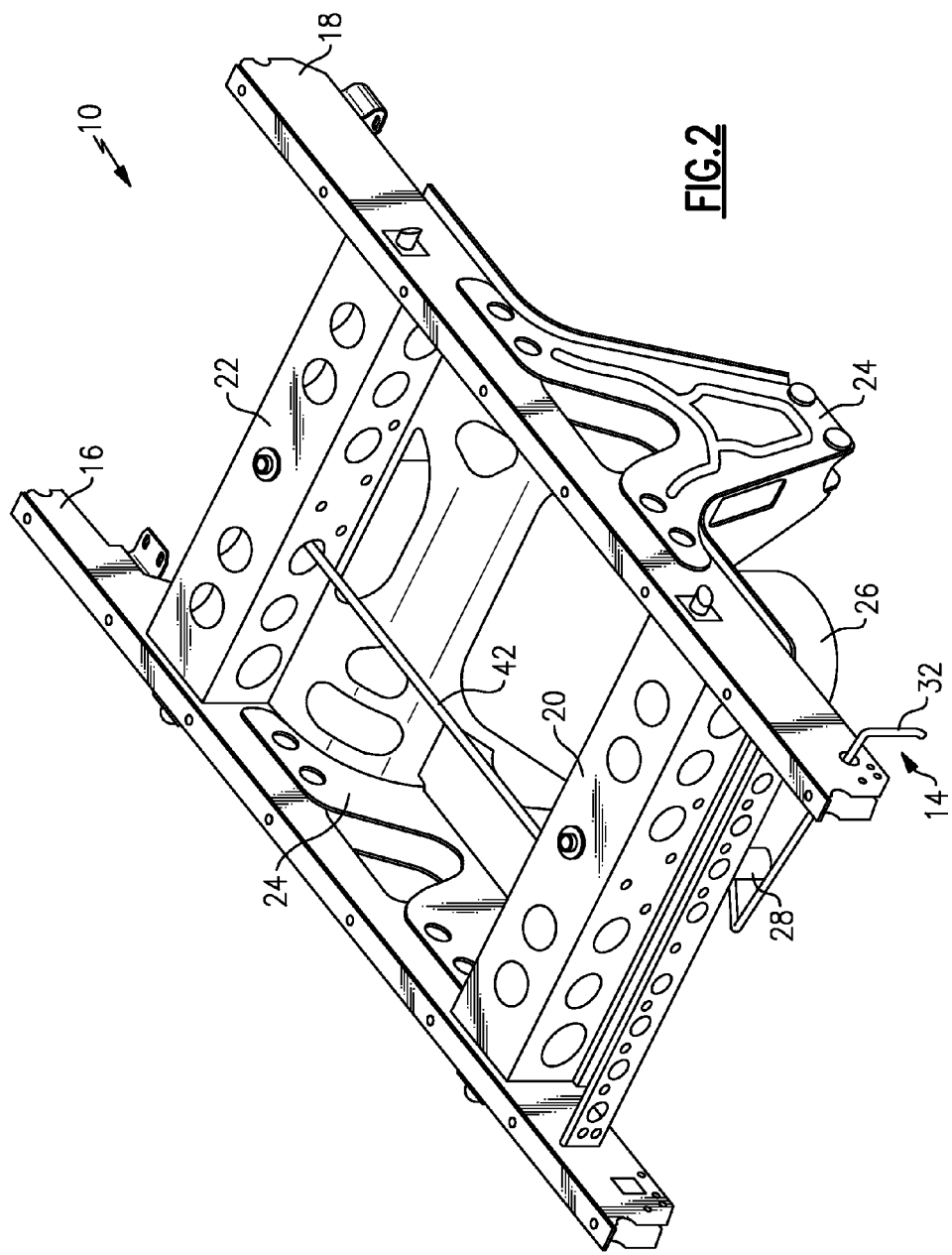
FIG. 2 is a top view of the suspension slider of FIG. 1.

In the example shown in FIGS. 1-2, the slider 10 includes first 16 and second 18 longitudinal members that are laterally spaced apart from each other, and first 20 and second 22 cross-members that extend between the first 16 and second 18 longitudinal members. The first 20 and second 22 cross-members are longitudinally spaced apart from each other.

Hanger brackets 24 extend from the first 16 and second 18 longitudinal members to support suspension components (not shown) as known. The suspension components are associated with axles (not shown) also as known, with spring elements 26 (FIG. 1) being positioned between the slider 10 and the axles. A single shock absorber 28 is positioned between each axle and a respective one of the first 20 and second 22 cross-members. A belly pan 30 (best seen in FIG. 1) is connected to the first 16 and second 18 longitudinal members, the first 20 and second 22 cross-members, and to the hanger brackets 24 to provide increased structural rigidity for the slider 10.

The locking mechanism 14 is actuated by a pull handle 32 that includes a handle portion that extends outwardly from one of the first 16 and second 18 longitudinal members. The pull handle 32 moves the locking mechanism 14 between a locked or extended position where the slider 10 is locked to a trailer support structure, and an unlocked or retracted position where a vehicle can move the trailer support structure relative to the slider 10 to reposition axle loads as needed.

Figure 3:
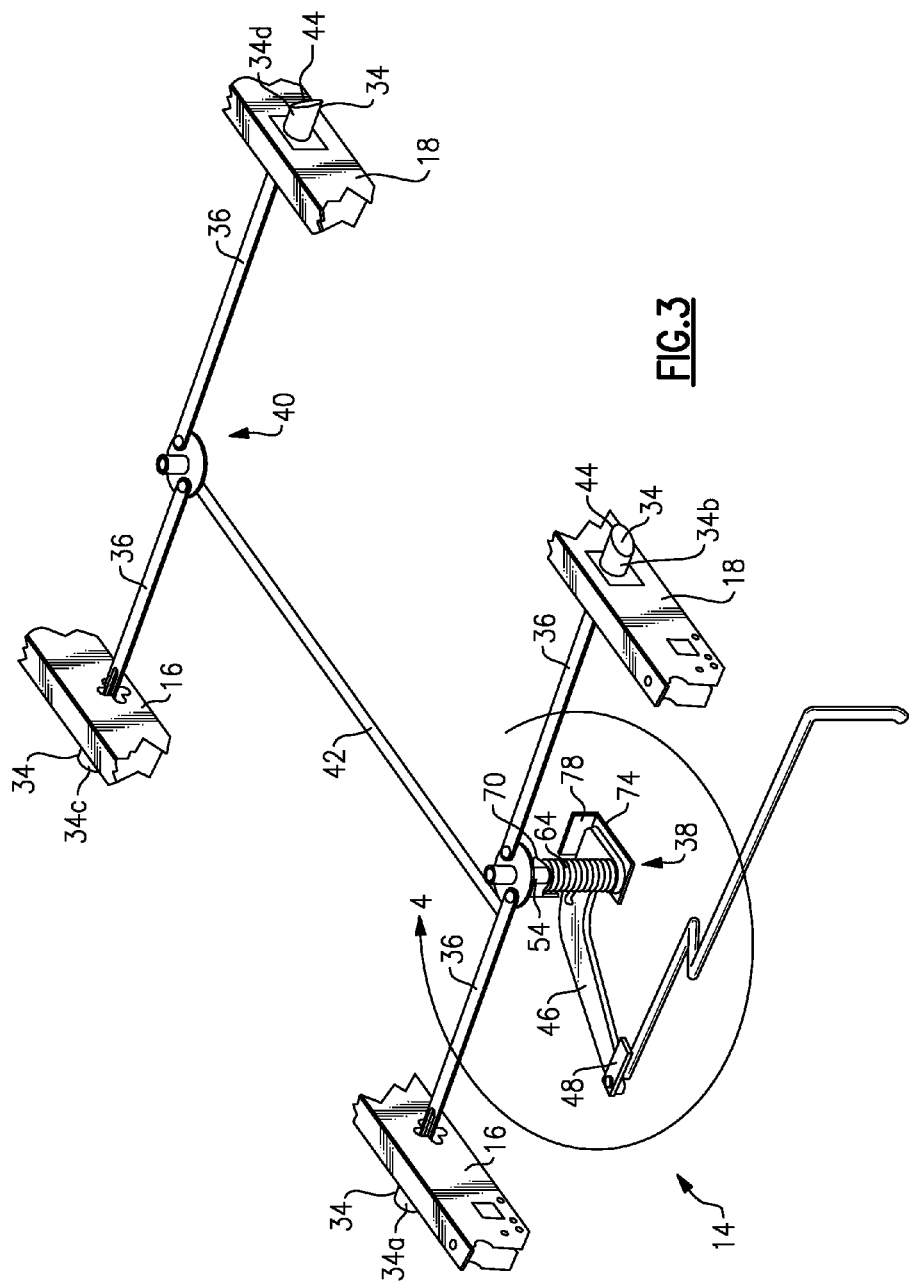
FIG. 3 is a perspective view of the locking mechanism of FIG. 1.

An example of the locking mechanism 14 is shown in FIG. 3. The locking mechanism 14 includes a plurality of pins 34 that extend through the first 16 and second 18 longitudinal members to lock into the trailer support structure when moved into the locked position. In the example shown, the plurality of pins 34 includes a front set of laterally spaced pins 34a, 34b and a rear set of laterally spaced pins 34c, 34d. Pins 34a and 34c are associated with the first longitudinal member 16 and pins 34b, 34d are associated with the second longitudinal member 18.

Each pin 34a, 34b, 34c, 34d is associated with a pin connection link 36. Each pin connection link 36 is associated with an actuator for the locking mechanism 14. In the example shown, a primary actuator 38 is used to control movement of the front set of pins 34a, 34b and a secondary actuator 40 is used to control movement of the rear set of pins 34c, 34d. The primary actuator 38 actuates the secondary actuator 40 via a fore-aft link 42 that extends longitudinally relative to the slider 10. The fore-aft link 42 acts in tension and thus can comprise a cable, or a rigid rod or tube.

It should be understood that while the primary actuator is shown as being associated with front pins, the positions of the primary actuator and secondary actuator could be reversed such that the primary actuator is associated with the rear set of pins. Also, while both front and rear sets of pins are shown, the locking mechanism could also be used with only one set of pins or with a greater number of pins depending upon the suspension configuration. In another contemplated configuration, the primary actuator could be used in a central configuration with the primary actuator acting on the fore-aft link with secondary actuating mechanisms being associated with each set of laterally spaced pins.

Additionally, in the example shown, each of the plurality of pins 34 is configured with an angled tip 44 to provide better pin engagement in the locked position. The description and operation of pins having such angled tips 44 is set forth in application Ser. No. 11/248,038 filed on Oct. 12, 2005, which is owned by the assignee of the present invention, and is herein incorporated by reference.

Figure 4:
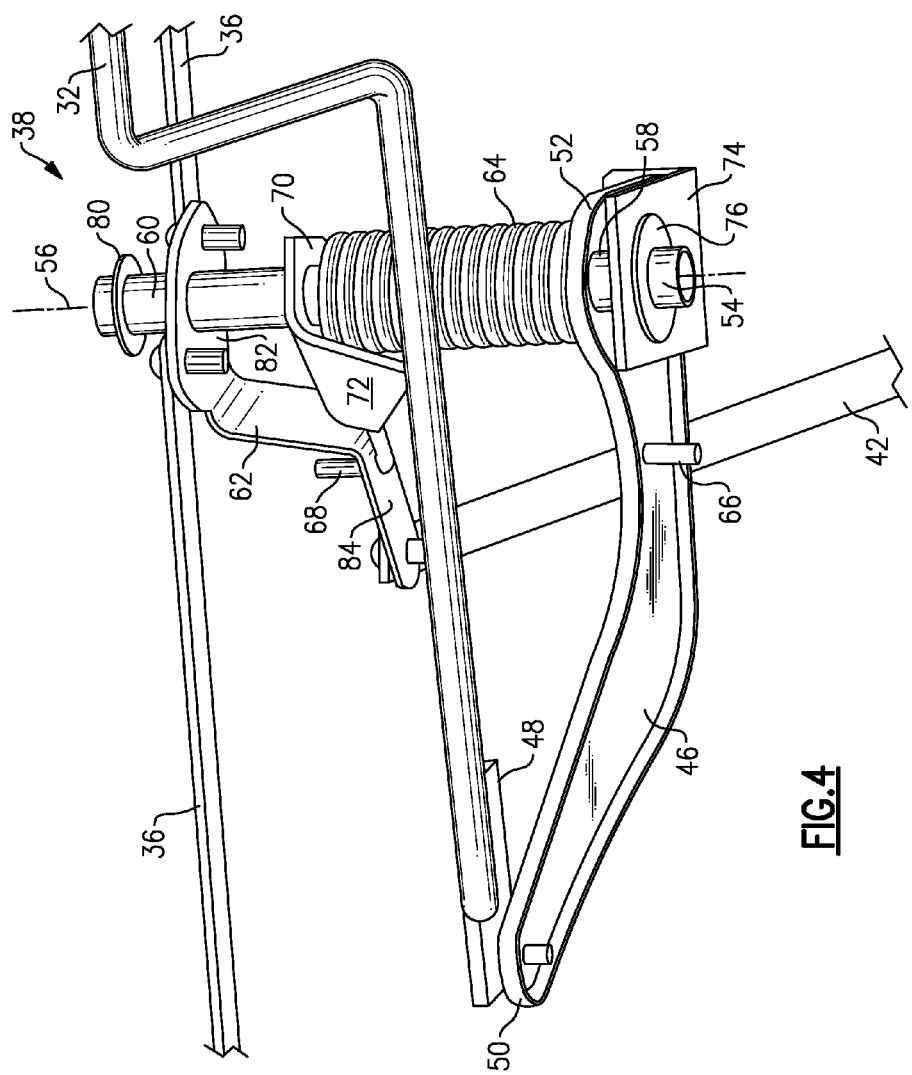
FIG. 4 is an enlarged perspective side view of a portion of the locking mechanism indicated in FIG. 3.

The primary actuator 38 is shown in greater detail in FIG. 4. The primary actuator 38 includes a lever 46 that is coupled to the pull handle 32. In the example shown, a plate 48 is fixed to the pull handle 32 by welding for example, and the plate 48 is pivotally mounted to one end 50 of the lever 46. Optionally, the pull handle 32 could connect to the lever 46 with a direct pivotal attachment.

A second end 52 of the lever 46 is fixed to a tube 54. The lever 46 can be attached to the tube 54 by welding or by a fastener attachment for example. The tube 54 defines an axis of rotation 56 that extends in a generally vertical direction. The tube 54 includes a first tube end portion 58 that is fixed to the lever 46 and a second tube end portion 60 that is associated with a cam 62. The cam 62 is capable of rotational movement relative to the tube 54.

A torsion spring 64 surrounds the tube 54 and is coaxial therewith. The torsion spring 64 has a first spring end 66 that is coupled to the lever 46 and a second spring end 68 that is coupled to the cam 62. A plate 70 is fixed to the tube 54 and includes a transversely extending ear portion 72 that acts as a stop to hold preload on the torsion spring 64 (best seen in FIG. 5).

A support bracket 74 is fixed to one of the cross-members and a washer 76 (FIG. 4) is fixed to the tube 54 to hold associated components in place. The first tube end portion 58 is rotatingly supported by the support bracket 74. The support bracket 74 includes a transversely extending flange 78 that provides a stop (see FIGS. 5-6) to prevent the lever 46 from contacting the spring element 26.

The second tube end portion 60 extends above the associated cross-member and a washer 80 (FIG. 5) is fixed to the tube 54 at a position above the cross-member. The washer 80 can be welded or fastened to the tube 54, for example. The washer 80 cooperates with the cross-member to hold the associated components in place.

Figure 5:
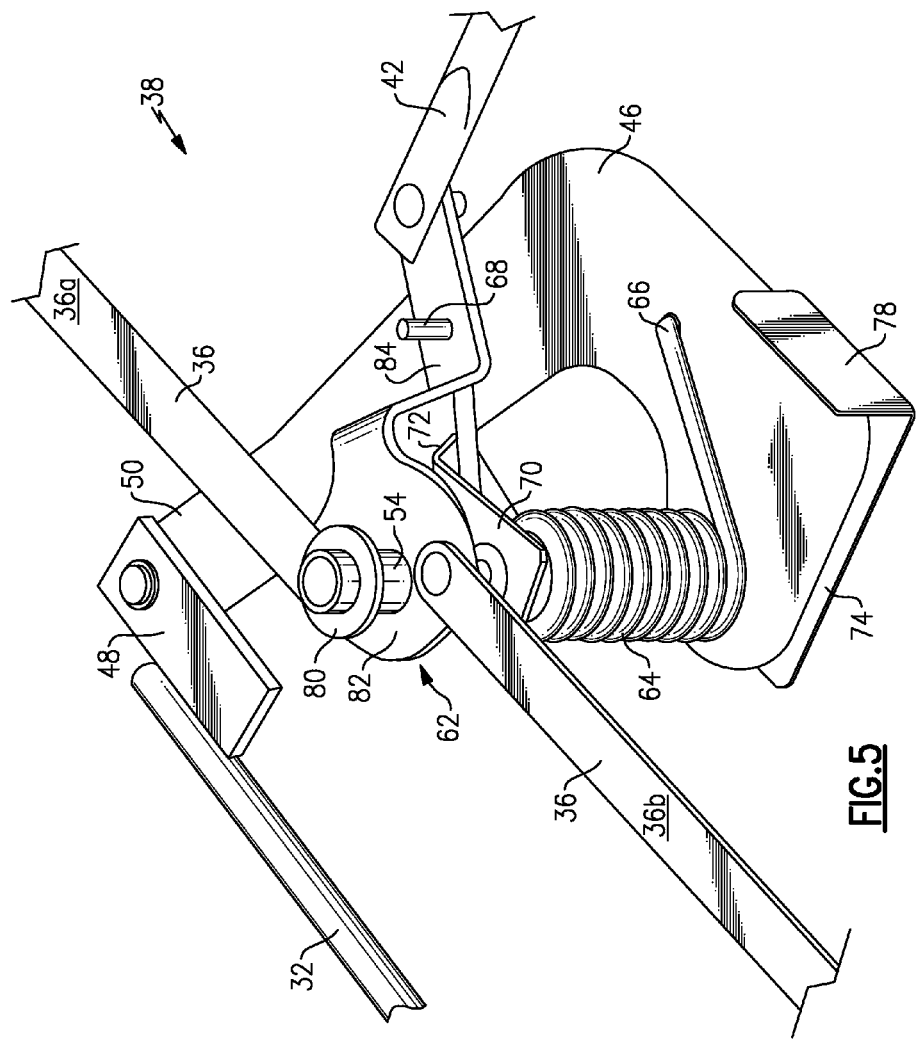
FIG. 5 is a top view of the locking mechanism shown in FIG. 4.

As shown in FIG. 5, the cam 62 includes a central body 82 that includes an opening for receiving the tube 54. The central body 82 also includes attachment interfaces for the pin connection links 36. A first pin connection link 36a has one end associated with pin 34a and a second end coupled to the central body 82. A second pin connection link 36b has one end associated with pin 34b and a second end coupled to the central body 82. The cam 62 also includes a radial arm portion 84 that extends first downwardly from the central body 82 and then outwardly. The fore-aft link 42 is coupled to a distal end of the radial arm portion 84 to transmit input from the lever 46 and cam 62 to the secondary actuator 40.

The pin connection links 36 are shown as flat rods having an embossed portion. However, the pin connection links could also be rigid rods or tubes. Further, in the example shown, each pin connection link 36 is attached to the cam 62 with a rivet attachment, however, other attachment interfaces could also be used.

The primary actuator 38 operates in the following manner. To move the pins 34 to the unlocked or retracted position, the pull handle 32 is pulled, which causes lever 46 to rotate. As lever 46 is fixed to tube 54, this movement also causes the tube 54 to rotate. If the pins 34 are free, there is enough preload on the torsion spring 64 such that as the tube 54 rotates, the torsion spring 64 and cam 62 will also rotate with the tube 54. In other words, the torsion spring 64 acts as a solid, non-flexible member, i.e. the torsion spring 64 does not wind, and rotates with the tube 54 and cam 62 as a unit. As the cam 62 rotates, the pin connection links 36 pull the pins 34 out of the locked position.

However, if one or more of the pins 34 are stuck, when the lever 46 is rotated by the pull handle 32 to retract the pins and allow adjustment, the cam 62 is frozen, i.e. the cam 62 cannot rotate. Additionally, the pin connection links 36 are also prevented from moving. As a result, when the pull handle 32 is pulled to retract the pins 34, the lever 46 rotates the tube 54 and winds the torsion spring 64 until the pull handle 32 is locked into place on one of the longitudinal members (see FIG. 7). Thus, the pull handle 32 is decoupled from the pins 34 by the torsion spring 64 if one or more of the pins 34 are stuck, such that the pull handle 32 can still be pulled out and locked into place.

Once the pins 34 break free due to adjustment of the trailer support structure relative to the slider 10 by moving the trailer, the torsion spring 64 rotates the cam 62, which moves the pin connection links 36 to retract the pins 34. Thus, the torsion spring 64 allows stuck pins to retract after the pull handle 32 has already been pulled and locked into place.

Figure 6:
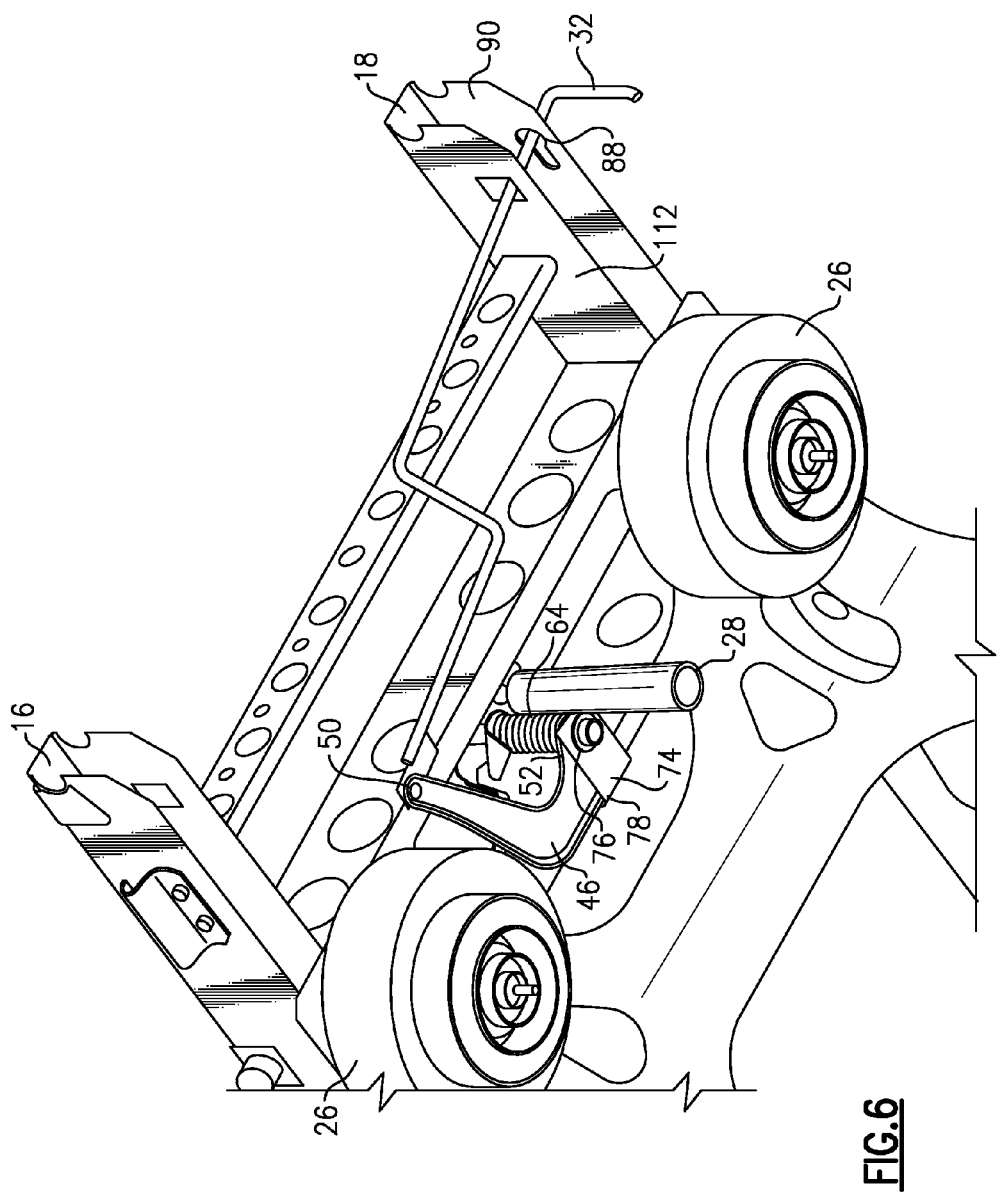
FIG. 6 is an enlarged perspective view of the portion of the locking mechanism of FIG. 4 installed in the suspension slider.

As shown in FIG. 6, the lever 46 is curved such that the lever 46 can be rotated without contacting the shock absorber 28. As discussed above, the transversely extending flange 78 of the support bracket 74 provides a rotation stop to prevent the lever 46 from contacting the spring element 26.

Figure 7:
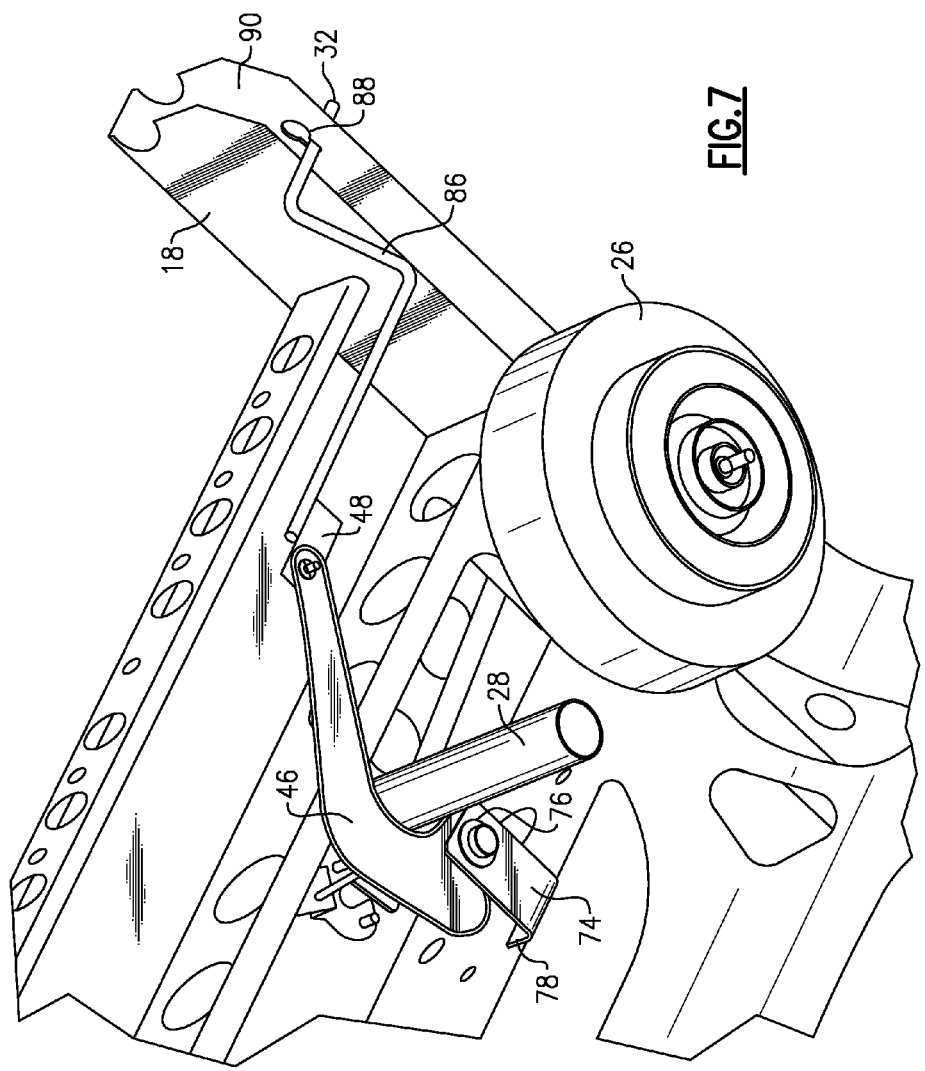
FIG. 7 is a view similar to FIG. 6 but showing a stop position for an actuation handle.

The pull handle 32 is also configured to include a stop to prevent over-pull of the pull handle 32. The pull handle 32 includes a bent portion 86 that provides an over-pull stop by contacting one of the longitudinal members as shown in FIG. 7. When the bent portion 86 contacts the longitudinal member to define a maximum travel limit in this direction, due to the curved configuration of the lever 46, contact with the shock absorber 28 is avoided.

When the pull-handle 32 is pulled to retract the pins 34, the pull handle 32 is moved longitudinally into a keyway slot 88 to hold the locking mechanism 14 in the unlocked position. In the example shown, the keyway slot 88 is formed within an outer wall 90 of the longitudinal member and can be oriented in any direction.

As discussed above, when the pull-handle 32 is actuated to retract the pins 34 to allow adjustment, the pull handle 32 rotates the lever 46 of the primary actuator 38, which then rotates the cam 62 to move the pin connection links 36. As the cam 62 rotates, input is provided to the fore-aft link 42 to operate the secondary actuator 40.

Figure 8:
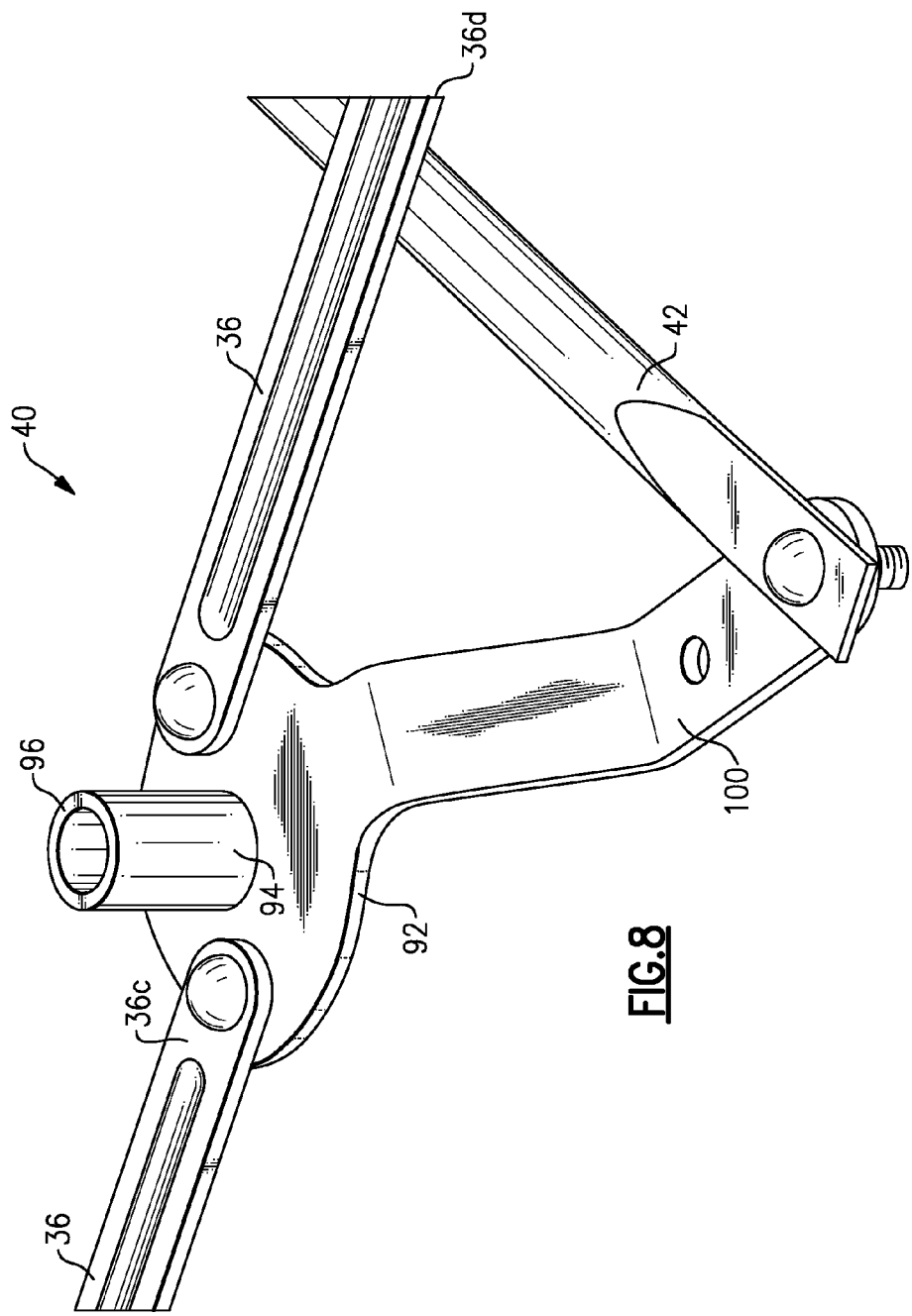
FIG. 8 is an enlarged perspective view of a portion of the locking mechanism indicated in FIG. 3.
Figure 9:
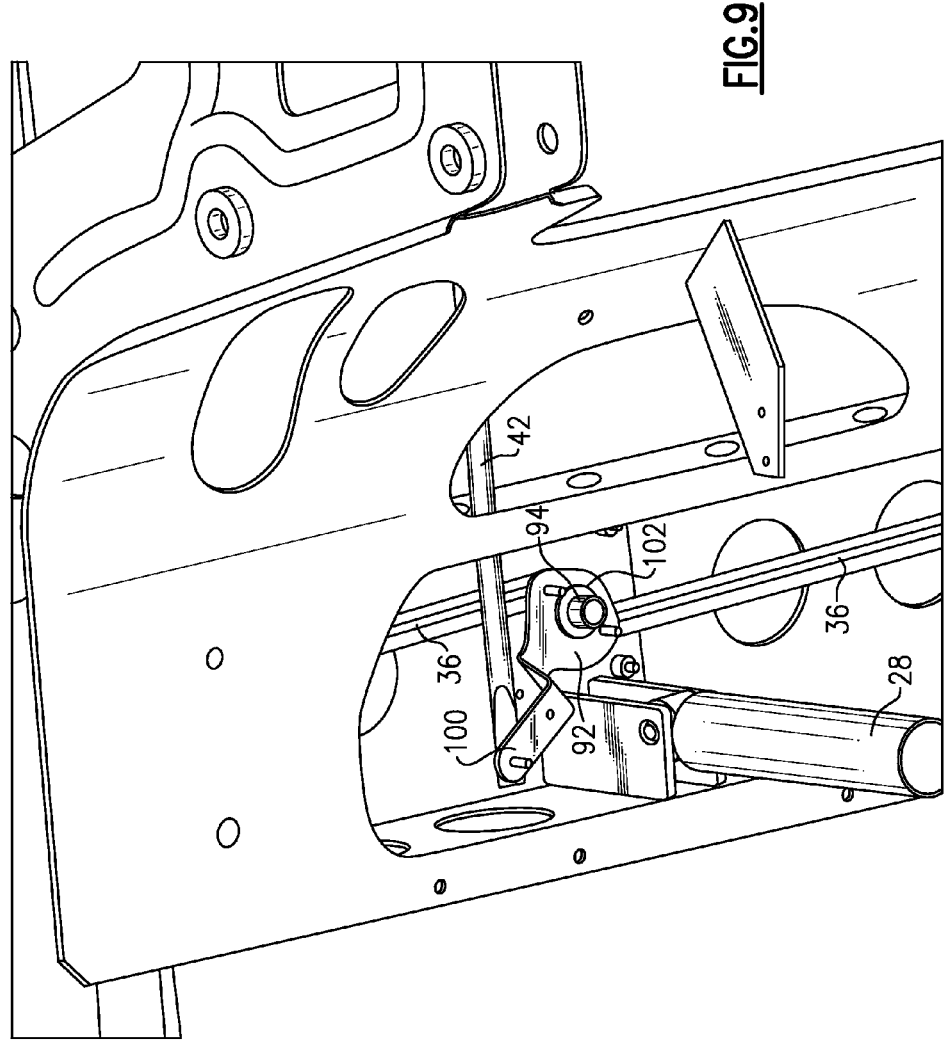
FIG. 9 is an enlarged perspective view of the portion of the locking mechanism of FIG. 8 installed in the suspension slider.

The secondary actuator 40 is shown in greater detail in FIGS. 8 and 9. The secondary actuator 40 includes a second cam 92 having a shape similar to that of cam 62. The second cam 92 has an opening that receives a tube 94. An upper end 96 of the tube 94 extends above the associated cross-member, which in the example shown is the rear cross-member. Tube 94 is fixed to cross-member 22 to hold the tube 94 in place.

The second cam 92 also includes attachment interfaces for pin connection links 36 for the rear set of pins 34c, 34d. A third pin connection link 36c has one end associated with pin 34c and a second end coupled to the second cam 92. A fourth pin connection link 36d has one end associated with pin 34d and a second end coupled to the second cam 92. The second cam 92 also includes a radial arm portion 100 that extends first downwardly from the second cam 92 and then outwardly. The fore-aft link 42 is coupled to a distal end of the radial arm portion 100 to receive input from the cam 62. As shown in FIG. 9, a washer 102 is fixed to tube 94 underneath the second cam 92 to hold cam 92 in place.

As shown in FIG. 10, each pin connection link 36 includes a slot 104 that extends in a generally lateral direction along a length of the pin connection link 36. In the example shown, one pin 34a from the first set of pins is shown, however, it should be understood that the other pins are similarly configured. The pin 34a has a pin end 106 that is coupled to the pin connection link 36 through a rivet attachment in the slot 104. Thus, the pin end 106 can move relative to the pin connection link 36 through an amount of travel defined by a length of the slot 104.

A single compression spring 108 is associated with the pin 34a. The single compression spring 108 has a first spring end that reacts against a pin body 110 and a second spring end that reacts against an inner wall 112 of the longitudinal member. The slot 104 and compression spring 108 cooperate to provide independent spring extension at each pin location. Thus, if some of the pins are blocked, i.e. a long side of a pin is not aligned with a corresponding opening in the trailer support structure, the pins that are not blocked, i.e. the long side of the pins which are aligned with corresponding openings, will still be able to extend and lock into the openings.

The inner wall 112 of the longitudinal member also includes an anti-rotation feature 114 that prevents the pin 34a from rotating relative to the longitudinal member. In the example shown, the anti-rotation feature comprises an opening formed within the inner wall 112. The opening is irregularly shaped such that the rivet attachment for the pin/link connection can be inserted through the opening but the pin end 106 is prevented from rotating. In the example shown, the opening is shaped as a cross.

Figure 12A:
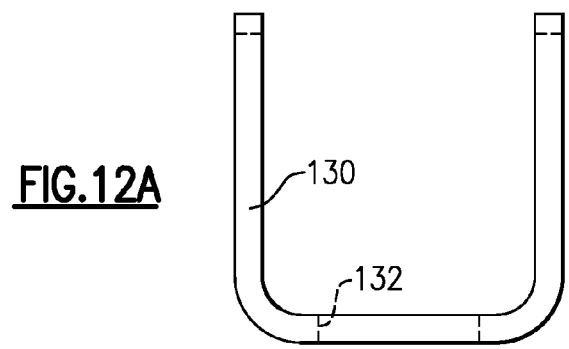
FIG. 12A is a top view of a plate including an alternate example of an anti-rotation feature.
Figure 12B:
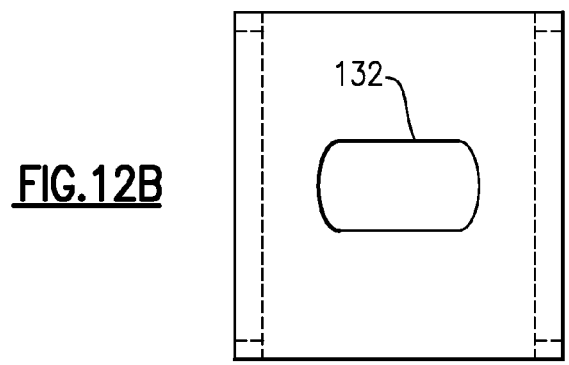
FIG. 12B is an end view of FIG. 12A.
Figure 12C:
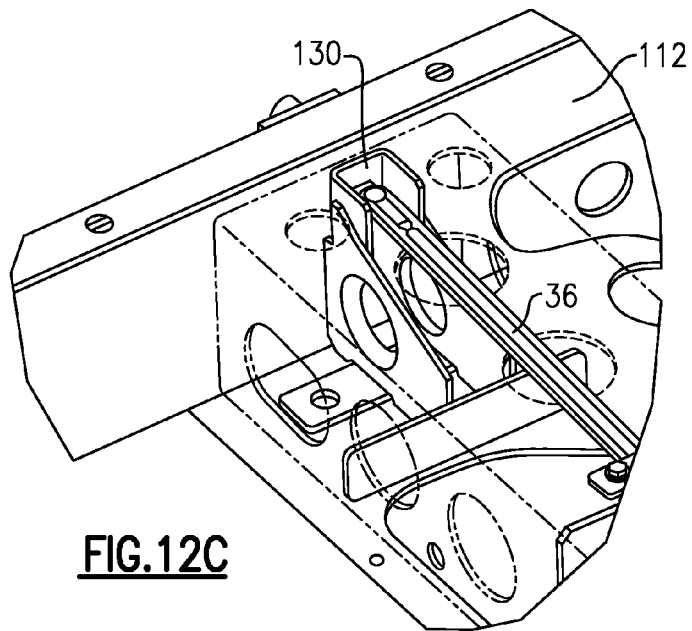
FIG. 12C shows the plate of FIG. 12A installed in a slider.

Another possible configuration, as shown in FIGS. 12A-12B, includes a clearance hole in the inner wall of longitudinal member 112 and a bracket or plate 130 that welds to the inner wall of longitudinal member 112 covering the clearance hole. This plate 130 includes an anti-rotate hole shape 132 as shown in FIG. 12B. This shape 132 is only one example, and other shapes could also be used. This option allows for easier assembly.

Optionally, as shown in FIG. 11, instead of providing slots in the pin connection links 36, a slotted cam 120 could be used. The slotted cam 120 would include a slot 122 for each pin connection link 36. The torsion spring, tube, and cam would operate in a manner similar to that described above with regard to the configuration shown in FIGS. 1-10.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An actuator for a locking mechanism of a suspension slider comprising:
   a pin connection assembly movable between an extended position and a retracted position
   a lever that moves said pin connection assembly between said extended and said retracted positions;
   a tube supported by a slider support structure, said lever being fixed to said tube to rotate said tube as said lever moves said pin connection assembly between said extended and said retracted positions;
   a cam supported by said tube for motion relative to said tube, said pin connection assembly being coupled to said cam and including pins adapted to cooperate with a frame member to lock the suspension slider to the frame member when said pin connection assembly is in said extended position;
   a torsion spring having a first end coupled to said lever and a second end coupled to said cam, said torsion spring providing pin retraction for one or more stuck pins in said pin connection assembly; and
   a plate fixed to said tube at an axial position between said cam and said torsion spring, said plate include a transversely extending ear portion that provides a stop for said torsion spring.

2. The actuator according to claim 1 wherein said torsion spring is coaxial with said tube.

3. The actuator according to claim 1 including a pull handle coupled to said lever, said pull handle adapted for actuation by a user to move said pin connection assembly between said extended and said retracted positions, and wherein said torsion spring allows said pull handle to be decoupled from said pin connection assembly if one or more pins are stuck such that said pull handle can be pulled out and locked into a slider support structure to allow slider suspension adjustment.

4. The actuator according to claim 1 wherein the suspension slider includes a first longitudinally extending member and a second longitudinally extending member laterally spaced from said first longitudinally extending member and wherein said pin connection assembly includes a first pin connector link having one end coupled to said cam and an opposite end cooperating with a first pin that selectively extends through an opening in said first longitudinally extending member, and a second pin connector link having one end coupled to said cam and an opposite end cooperating with a second pin that selectively extends through an opening in said second longitudinally extending member.

5. The actuator according to claim 4 wherein said torsion spring, said tube, said lever, and said cam cooperate to form a primary actuator for controlling movement of said first and said second pins and including a secondary actuator for controlling movement of third and fourth pins, and wherein said first and second pins comprise one of a forward and rearward lock for the suspension slider and said third and fourth pins comprise the other of said forward and rearward lock for the suspension slider.

6. The actuator according to claim 5 including a fore-aft link having one end coupled to said cam and an opposite end coupled to said secondary actuator.

7. The actuator according to claim 6 wherein said secondary actuator includes a second cam, a third pin connector link having one end coupled to said second cam and an opposite end cooperating with said third pin, and a fourth pin connector link having one end coupled to said second cam and an opposite end cooperating with said fourth pin.

8. The actuator according to claim 4 wherein at least one of said cam and said first and second pin connector links includes a slot to allow said first and second pin connector links to move axially relative to at least one of said cam and said first and second pins to allow independent pin extension at each pin location.

9. A suspension slider comprising:
first and second longitudinal members laterally spaced apart from each other;
first and second cross members extending between said first and second longitudinal members and being longitudinally spaced apart from each other; and
a locking mechanism including a plurality of pins adapted to selectively engage a frame member to lock the suspension slider to the frame member, said locking mechanism comprising;
a lever that moves said plurality of pins between an extended position and a retracted position,
a tube supported by one of said first and said second cross members, said lever being fixed to said tube to rotate said tube as said lever moves said plurality of pins between said extended and said retracted positions,
a cam supported by said tube for motion relative to said tube,
a first pin connection link having one end coupled to said cam and an opposite end cooperating with a first pin of said plurality of pins,
a second pin connection link having one end coupled to said cam and an opposite end cooperating with a second pin of said plurality of pins,
a torsion spring having a first end coupled to said lever and a second end coupled to said cam, said torsion spring providing pin retraction when at least one of said first and said second pins is stuck, and
a first plate axially positioned between said cam and said torsion spring and fixed to said tube, said first plate including a transversely extending ear that provides a stop to hold a preload on said torsion spring.

10. The suspension slider according to claim 9 wherein said tube defines an axis of rotation that extends in a generally vertical direction, said torsion spring being coaxial with said tube.

11. The suspension slider according to claim 9 wherein said tube, said torsion spring and said cam rotate together as a unit during retraction when none of said plurality of pins is in a stuck condition.

12. The suspension slider according to claim 9 wherein said tube rotates relative to said cam when at least one of said plurality of pins is in a stuck condition such that said lever can be moved into a locked position to allow slider suspension adjustment.

13. The suspension slider according to claim 9 including a second plate fixed to a slider support structure, said second plate including a transversely extending flange that provides a stop for said lever.

14. The suspension slider according to claim 9 wherein said torsion spring, said tube, said lever, and said cam cooperate to form a primary actuator for controlling movement of said first and said second pins and including a secondary actuator for controlling movement of third and fourth pins of said plurality of pins wherein said first and second pins comprise one of a forward and rearward locking pin set for the suspension slider and said third and fourth pins comprise the other of said forward and rearward locking pin set for the suspension slider.

15. The suspension slider according to claim 14 wherein said secondary actuator comprises a second cam coupled to said primary actuator with a fore-aft link, a third pin connection link having one end coupled to said second cam and an opposite end cooperating with said third pin, and a fourth pin connection link having one end coupled to said second cam and an opposite end cooperating with said fourth pin.

16. The suspension slider according to claim 9 including a first single compression spring reacting between said first pin and a wall of said first longitudinal member and a second single compression spring reacting between said second pin and a wall of said second longitudinal member, and wherein said walls of said first and said second longitudinal members each include an anti-rotation feature formed within said wall to prevent said first and said second pins from rotating relative to said wall.

17. The suspension slider according to claim 16 wherein at least one of said cam and said first and second pin connection links includes at least one slot that cooperates with a respective one of said first and second single compression springs to provide independent pin extension at each pin location.

18. The suspension slider according to claim 9 including a second plate fixed to at least one of said first and said second longitudinal members, said second plate including an anti-rotation feature formed within said second plate to prevent said first and said second pins from rotating relative to said first and said second longitudinal members.

* * * * *

UNITED STATES PATENT AND TRADEMARK OFFICE
CERTIFICATE OF CORRECTION

PATENT NO. : 7,604,248 B2  
APPLICATION NO. : 11/432850  
DATED : October 20, 2009  
INVENTOR(S) : Bromley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 753 days.

Signed and Sealed this

Fifth Day of October, 2010

David J. Kappos  
*Director of the United States Patent and Trademark Office*